United States Patent [19]

Gillespie

[11] Patent Number: 5,014,841
[45] Date of Patent: May 14, 1991

[54] CLUTCH ADJUSTMENT AND LOCKUP SYSTEM

[76] Inventor: Joseph D. Gillespie, 3110 Westerland, Houston, Tex. 77063

[21] Appl. No.: 430,186

[22] Filed: Nov. 1, 1989

[51] Int. Cl.$^5$ ............................................. F16D 43/12
[52] U.S. Cl. ............................ 192/105 C; 192/105 F; 192/103 A; 192/103 F; 192/83
[58] Field of Search ........... 192/105 C, 105 F, 103 A, 192/103 F, 86, 70.25, 110 R, 83

[56] References Cited

U.S. PATENT DOCUMENTS

| | | | |
|---|---|---|---|
| 2,513,378 | 7/1950 | Thelander | 192/105 C |
| 2,590,012 | 3/1952 | Hill | 192/12 |
| 2,633,218 | 3/1953 | Pelstick | 192/86 |
| 3,137,311 | 6/1964 | Rohweder et al. | 137/495 |
| 3,291,274 | 12/1966 | Wyman | 192/105 C |
| 3,444,972 | 5/1969 | Carstensen et al. | 192/85 |
| 3,823,802 | 7/1974 | Winzeler et al. | 192/86 |
| 3,831,726 | 8/1974 | Woody et al. | 192/103 FA |
| 3,863,746 | 2/1975 | Schulz | 192/86 |
| 3,951,009 | 4/1976 | Audifferd, Jr. et al. | 74/732 |
| 4,111,291 | 9/1978 | Horstman | 192/105 C |
| 4,186,829 | 2/1980 | Schneider et al. | 192/109 F |
| 4,632,230 | 12/1986 | Bilharz et al. | 192/33 |
| 4,889,217 | 12/1989 | Janiszewski et al. | 192/83 |

OTHER PUBLICATIONS

"Horstman Axle Clutch Owner's Manual"—4 pages.
One-page Tilton document entitled "Release Bearings".
One-page Tilton document entitled "Hydraulic Release Bearings".
One-page document entitled "Burco Axle Clutch Set-Up Instructions".
One-page advertisement from p. 148 of World Karting Magazine dated Jan. 1988 for Burco Racing Products of Los Angeles, Calif.
One-Page document from Tilton Engineering, Inc., Buellton, Calif. entitled "Annular Throw Out Bearing Assembly for Hewland Weisman Transmission".
One-page document from Tilton Engineering, Inc., entitled "Annular Throw Out Bearing Assembly and Installation".

Primary Examiner—Allan D. Herrmann
Assistant Examiner—Andrea Pitts
Attorney, Agent, or Firm—Pravel, Gambrell, Hewitt, Kimball & Krieger

[57] ABSTRACT

A clutch adjustment and lockup system is disclosed. The system is adapted for use with a centrifugally actuated friction clutch of the type wherein clutch plates and clutch disks are engageable with each other. The conventional friction clutch includes a weight support member having apertures concentric with the plates and disks and is interlocked with the plate for rotation therewith. The conventional support member includes a plurality of pivotable weights causing the plate to frictionally engage the disk upon rotation of the support member. Springs are provided to counteract the weights, thereby resisting frictional engagement of the plates and disks until a predetermined speed is achieved. The improved adjusting system allows remote setting of the speed at which the plates frictionally engage the disk while the vehicle is moving and a lockup system provides increased frictional engagement of the clutch plate and disks.

11 Claims, 5 Drawing Sheets

5,014,841

CLUTCH ADJUSTMENT AND LOCKUP SYSTEM

BACKGROUND OF THE INVENTION

1. Technical Field of the Invention

This invention relates to a clutch and more particularly a system for remotely adjusting and locking up a friction clutch.

2. Description of Prior Art

Friction clutches that engage at a predetermined speed have been known for some time and are particularly useful in combination with motors, such as internal combustion engines, that are not capable of starting under load conditions. The engine is permitted to accelerate freely with the clutch disengaged until a point on the power curve is achieved where the engine produces sufficient torque. At this predetermined speed the clutch automatically engages to transfer the torque.

Previously known centrifugal friction clutches have exhibited a number of important shortcomings. U.S. Pat. No. 4,111,291 discloses a centrifugally actuated friction clutch, designed for a small displacement internal combustion engine, connected to the rear axle of a go-cart. This clutch uses centrifugal force to transmit the engine's torque to the wheels. Spring force in the clutch is adjusted to counteract the engagement by centrifugal force until the engine reaches a predetermined speed. Then the clutch hooks up and stays hooked up until the engine drops below this predetermined speed. The '291 patent discloses a plurality of screws for adjusting the spring force that are accessible through apertures in the clutch cover to allow adjustment without disassembling the clutch. This accessibility, while allowing fine adjustment of the engagement speed by trial and error of on-track testing, still requires that the go-cart be taken off the track and stopped so that a screw driver may be inserted into the apertures to make the required adjustments.

This prior art clutch is undesirable because of (1) the consumption of time required for an empirical analysis to achieve the right adjustment for different track conditions; (2) inability of the operator to have immediate feedback of the operation of the clutch while the vehicle is moving; and (3) lack of an engagable and disengagable lockup mechanism to provide enhanced engagement of the friction clutch while the vehicle is moving.

SUMMARY OF THE INVENTION

Briefly, according to the invention a clutch adjustment and lockup system is provided. The system is adapted for use with a centrifugally actuated friction clutch used with a vehicle of the type wherein clutch plates and clutch disks are engagable with each other. The conventional friction clutch includes a weight support member having apertures and the member is concentric with the plates and disks. The support member includes a plurality of pivotable weights which apply a load on the plate to frictionally engage the disk upon rotation of the support member. Springs are provided to urge the plate to the support member thereby restraining the frictional engagement of the plates and disks until a predetermined speed is reached. The improvement to the above conventional friction clutch comprises a remote means for adjusting the speed at which the plates frictionally engage the disk while the vehicle is moving and a lockup system to provide enhanced engagement of the clutch plates and disks.

BRIEF DESCRIPTION OF THE DRAWINGS

The objects, advantages and features of the invention will become more apparent by reference to the drawings which are appended hereto wherein like numerals indicate like parts and wherein an illustrative embodiment of the invention is shown, of which.

DESCRIPTION OF THE PREFERRED EMBODIMENT

The clutch adjustment and lockup system of the present invention, indicated generally at 10, is adapted for use with a clutch used with a go-cart including road racers and sprint racers. The Horstman axle clutch is an example of such a clutch for go-carts. U.S. Pat. No. 4,111,291 to Horstman is incorporated herein for all purposes but it is to be understood that the present invention could be used with other clutch devices including the Burco clutch manufactured by Burco Racing Products of Los Angeles, Calif.

Figure 1:
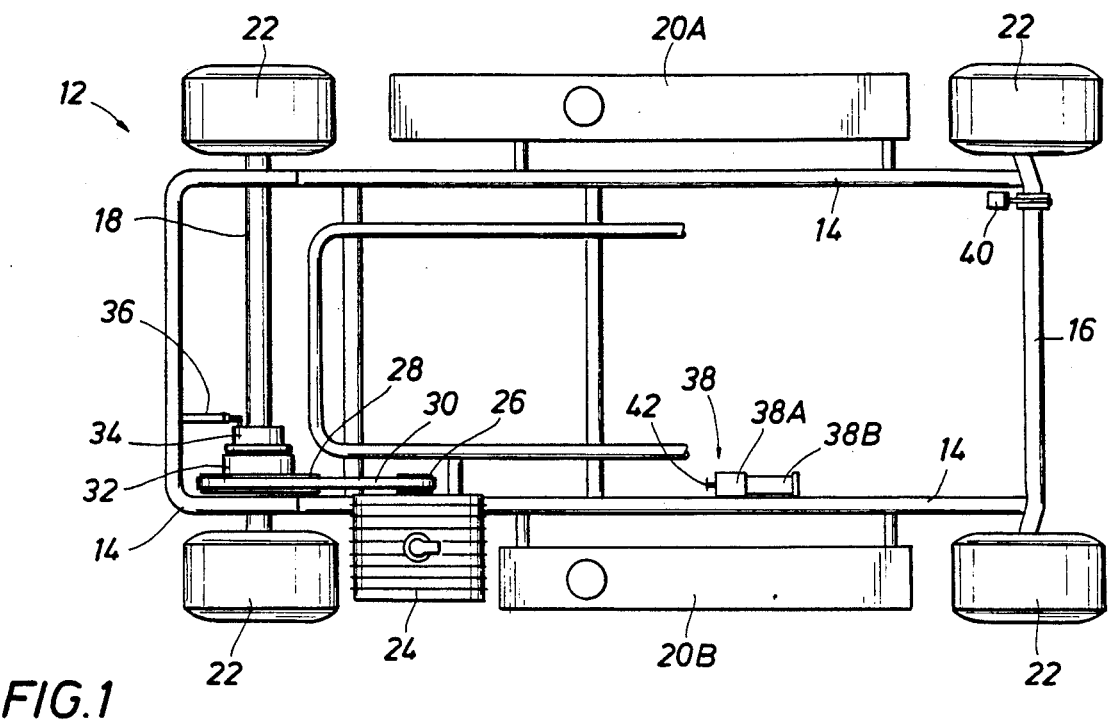
FIG. 1 is a plan view of the clutch adjustment and lockup system according to the present invention adapted for use with a go-cart.

FIG. 1 shows a typical go-cart, generally indicated as 12, having a frame 14, a front axle 16, a rear axle 18 and gas tanks 20A and 20B attached to the frame 14. Wheels 22 are attached to their respective axles 16 and 18. The frame 14 of FIG. 1 is shown in broken view to better illustrate the present invention and the steering system and seating arrangement for the go-cart were also eliminated. Additionally, the conventional go-cart 12 includes an engine 24, generally a two-cycle engine, which turns sprocket 26. Sprocket 28 is turned by means of drive belt 30 driven by sprocket 26. The sprocket 28 is connected to clutch 32, as will be described in detail below. Adjustment device 34 of the present invention is axially fixed about axle 18 adjacent to the clutch 32. An anti-rotation bar 36 attaches device 34 to the frame 14 to prevent rotation of the cylinder 50 and the outer race/hydraulic fixed element 142 of device 34.

The hydraulic system of the present invention includes an adjuster/accumulator 38 which includes a hand-operated adjuster 38A and an accumulator 38B, that will be discussed in detail below. The adjuster/accumulator 38 is positioned next to frame 14 of the go-cart 12 to facilitate use of the handle 42 by the operator. Additionally, a foot pedal 40 of the lockup system is attached to the frame 14 of the go-cart 12 to facilitate foot operation.

Figure 2:
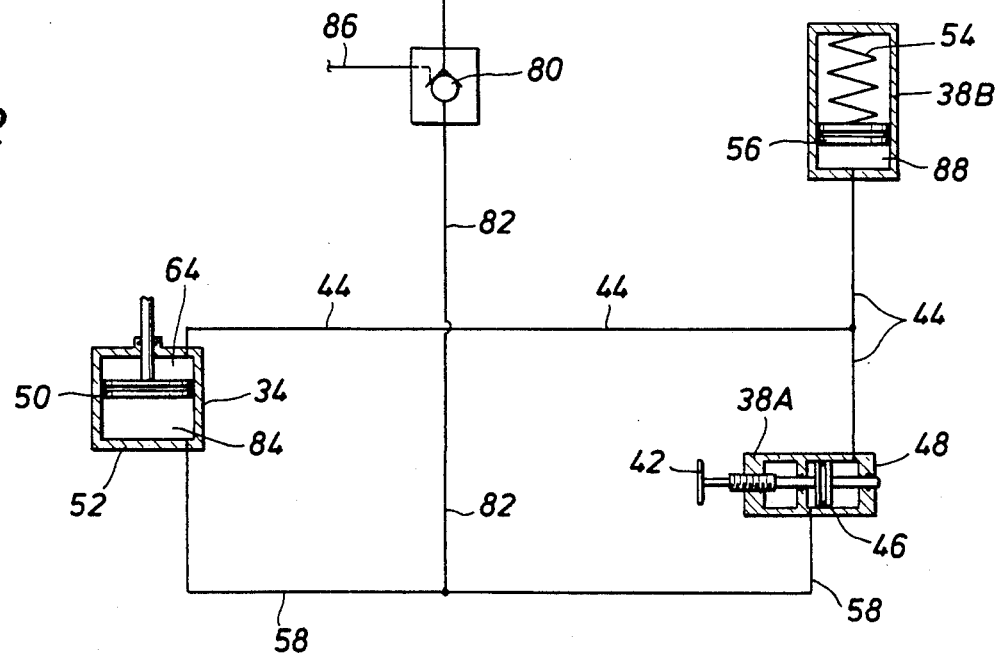
FIG. 2 is a schematic of the hydraulic system according to the present invention.

Turning to FIG. 2, a schematic of the hydraulic system used with the present invention is shown. The adjuster/accumulator 38 is shown with the adjuster 38A, the accumulator 38B as two different elements for clarity purposes. The handle 42 of the adjuster 38A may be turned counterclockwise or clockwise to position the piston 46 for the desired pressure in the adjustment device 34. Preferably hydraulic line 44 contains between 0 to 150 pounds per square inch of pressure when it is not in the lockup mode, but other pressures could be used depending on the system configuration. When the handle 42 is rotated, the piston 46 is mechanically moved to and from the end 48 of the adjuster 38A. If the piston 46 is moved toward end 48, the pressure in line 44 is increased thereby moving cylinder 50 of the adjustment device 34.

The accumulator 38B is preferably preloaded at 500 pounds per square inch. When the hydraulic fluid pressure in line 44 of the system exceeds the predetermined preload the fluid is allowed to accumulate therein. Spring 54, which provides the predetermined preload in the accumulator 38B, forces the piston 56 to displace the hydraulic fluid back into the system when the pressure falls below the predetermined preload, as will be discussed in detail below. Additionally, hydraulic line 58 is provided between the adjuster 38A and the device 34, as will be discussed below.

Advantageously, the present invention includes a lockup system. The operator by stepping on foot pedal 40 pivots the arm 66 about pivot pin 70 to move the piston 72 towards end 74 of lockup reservoir 76 to increase pressure in line 78. This pressure increase travels by check valve 80 into hydraulic line 82 which then enters into line 58 to chamber 84 to move the cylinder 50 into the lockup position, as shown in detail in FIG. 5. A manual release mechanism 86 including a pilot operated spring return spool valve is provided for release of the pressure in line 82, chamber 84 of device 34 and chamber 88 of accumulator 38B. In the preferred embodiment, application of the fluid from chamber 90 of lockup reservoir 76 into line 78 provides an increase in the line pressure from 150 to 600 pounds per square inch.

To better understand the operation of the present invention and its advantages, it should be understood that stall speed, commonly called clutch slip in cart racing, is defined as the rpm that places the centrifugal clutch in the hookup position. In this hookup position, the plurality of weights, one of them indicated as 92 in FIG. 4, urges the plate and disk of the friction clutch 32 into engagement but only after it has counteracted the pressure of the springs, one of the springs is indicated at 94. Adjusting the clutch for more slip is actually raising the required stall speed, rpm or centrifugal force when the clutch will engage. Adjusting the clutch for less slip lowers the required stall speed, rpm or centrifugal force.

Though overslipping of the clutch can develop heat build-up which destroys the clutch disk, if the engine bogs during the on track adjustment (particularly in the tightest cornering of the track) the operator needs to adjust the clutch for more slip for optimum performance. If the engine is over-revving off the tight corner, the clutch is excessively slipping; therefore the operator should adjust for less clutch slip. In other words, the optimum setting is the lowest rpm that will not cause the engine to bog down.

Figure 3:
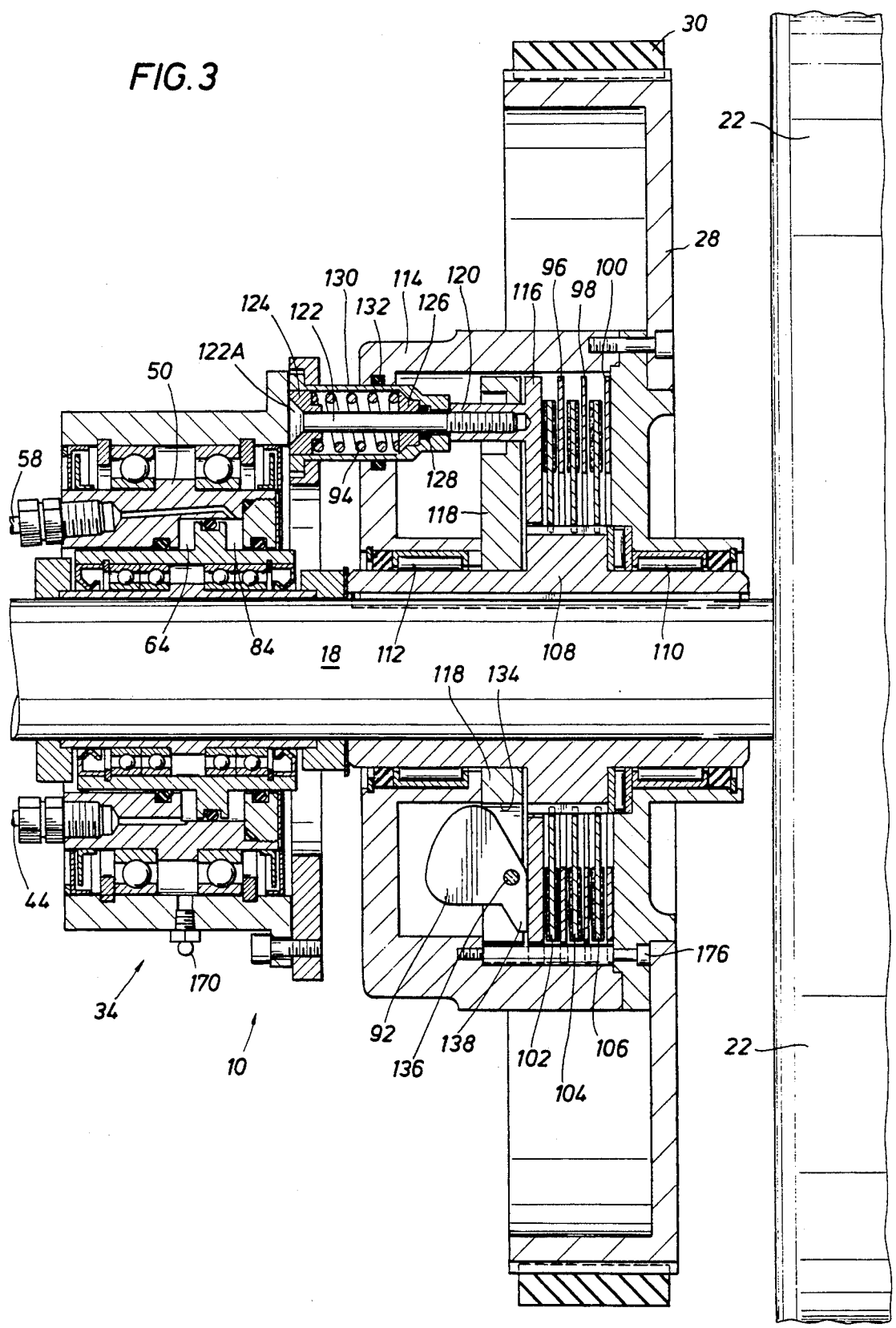
FIG. 3 is an enlarged sectional elevation view of the adjustment device of the present invention in a rest position.

Turning now to FIG. 3, the clutch 32 includes a pressure plate 116 and three floater plates 96, 98 and 100 and three friction disk 102, 104 and 106 positioned between the plates. Conventional friction linings are attached to both faces of each disk 102, 104 and 106 to resist relative rotation when sufficient axial pressure is applied to the plate-disk stack. A splined hub 108 that is keyed into shaft 18 is positioned for engagement with the disks 102, 104 and 106. Bearings 110 and 112 are positioned between the hub 108 and the housing 114 of the clutch 34. In the preferred embodiment, the friction disks 102, 104 and 106 are toothed about their inner edges to engage the splines of the hub 108 to rotate all the disks in unison. It is to be understood that the hub could have other engagement configurations, such as that shown in U.S. Pat. No. 4,111,291. Plates 96, 98, 100, and 116 have central openings of larger diameter than the hub 108 so that they are free to rotate independently of the disks when they are not frictionally engaged with the disks. Pressure plate 116 is provided between the disks and a cast aluminum weight support member 118. Plate 116 has a circular configuration approximately equal to that of the plates 96, 98 and 100. Pressure plate 116 preferably carries six symmetrically spaced, integrally formed stems 120. Stems 120 extend through apertures in the support member 118 and are internally threaded to receive axially projecting screws 122. Coil spring 94 encircles the screw 122 and is compressed between the screw head 122A and thimble 130. More particularly, the spring 94 is positioned between the retainer 124 and the retainer 126 within thimble 130. O-ring 128 is provided between retainer 126 and thimble 130 for sealing purposes as are the other seals in the invention. O-ring 132 is provided between the housing 114 of clutch 32 and the outer surface of thimble 130 to maintain the fluid in the clutch 32. Spring 94 urges pressure plate 116 toward the support member 118 to provide spacing between the plates 116 and 100 to permit the plates 116, 96, 98 and 100 to rotate independently of the disks 102, 104 and 106. Accordingly, the six springs 94 of the preferred embodiment bias the clutch 32 toward a disengaged rest position as shown in FIG. 3.

Figure 4:
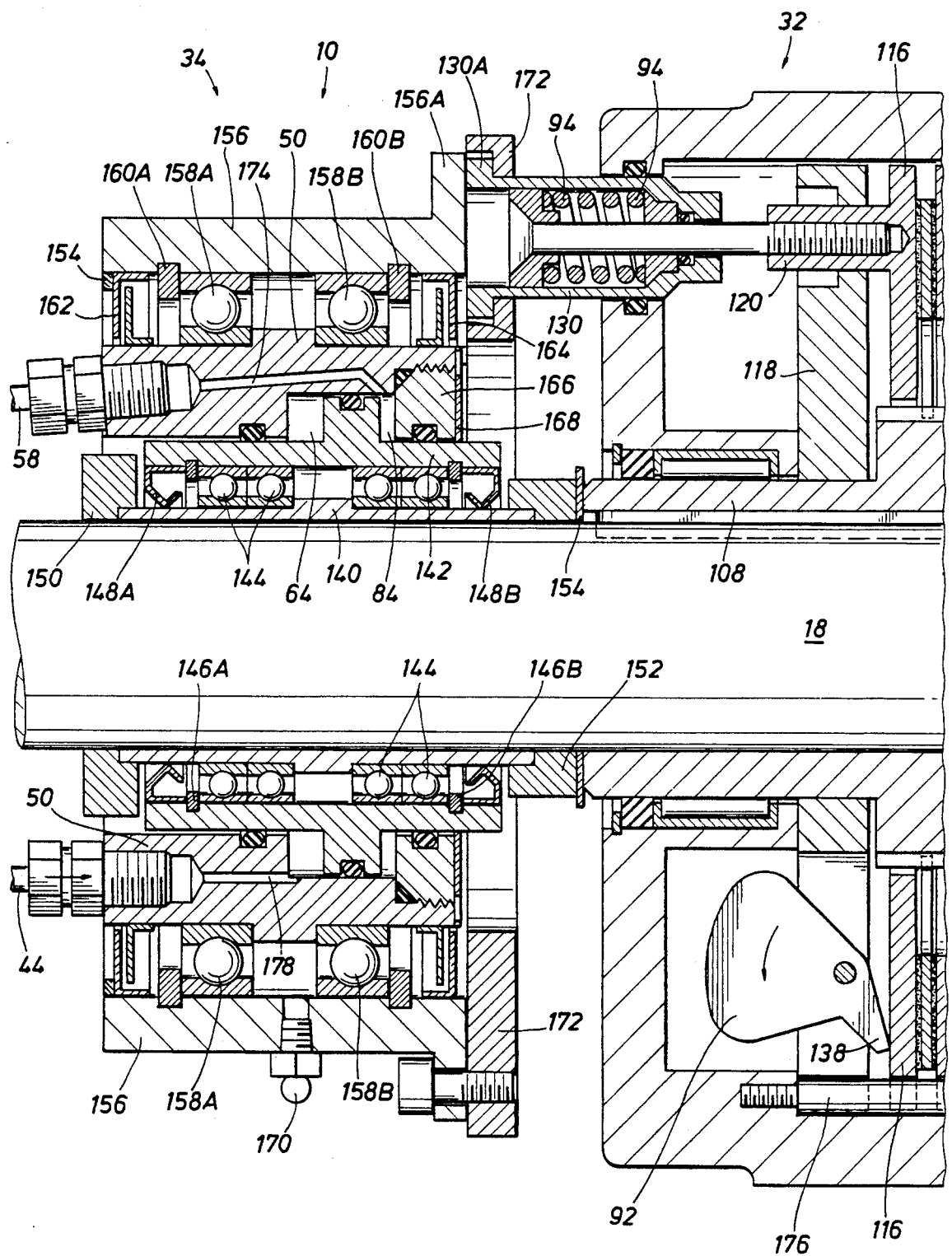
FIG. 4 is an enlarged sectional elevation view of the device, similar to FIG. 3, in a hooked-up position.
Figure 5:
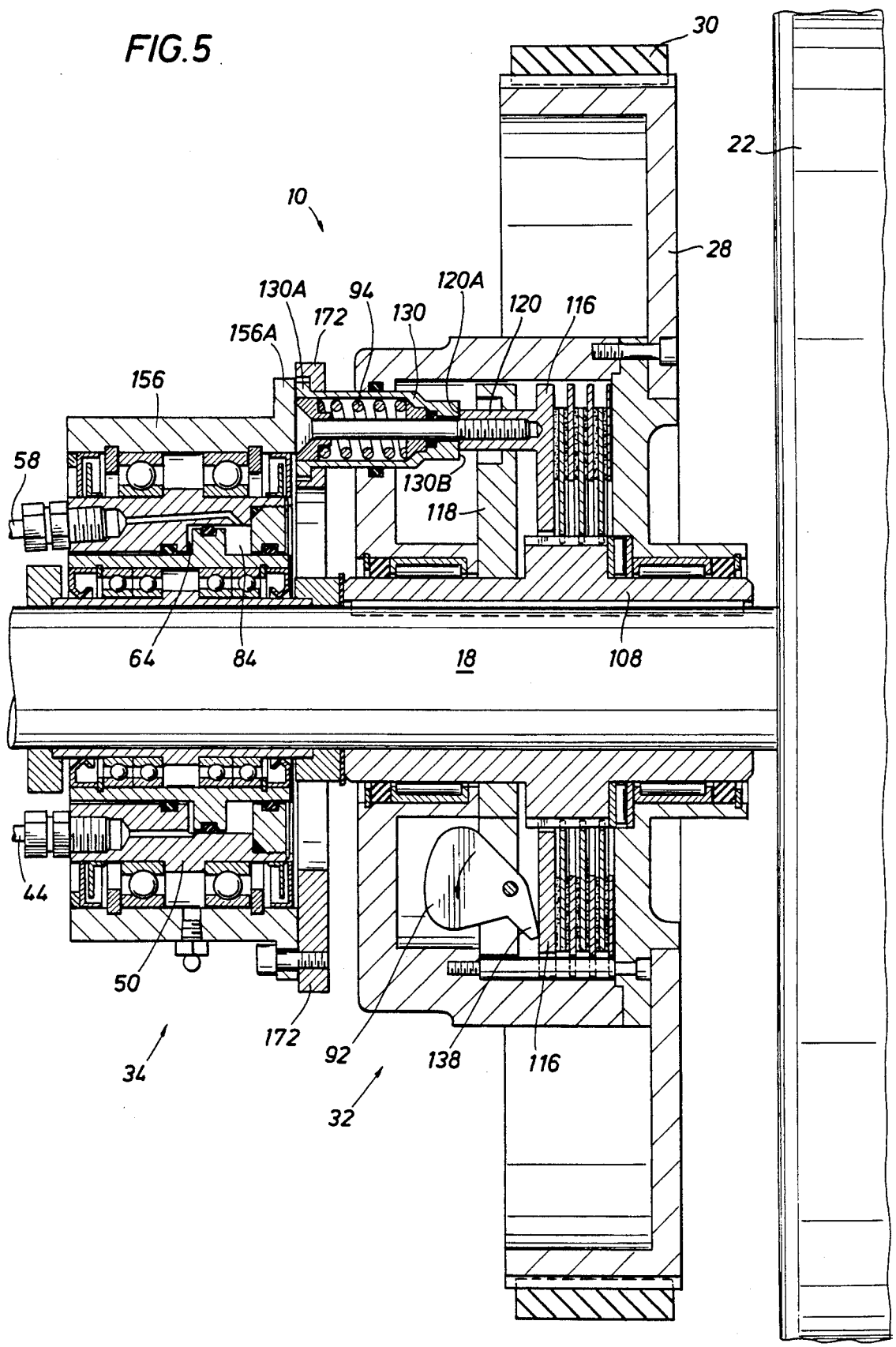
FIG. 5 is a sectional elevation view of the adjustment device, similar to FIG. 3, according to the present invention in a lockup position.

As previously discussed, engagement of the clutch 32 in response to a predetermined centrifugal force is achieved by use of a set of weights similar to weight 92. Each weight 92 is disposed within a slot 134. The slots, similar to slot 134, as shown in FIGS. 3, 4 and 5, are radially oriented and symmetrically arranged about the support member 118. A pin 136 extends across each slot 134 in a direction perpendicular to the rotational axis of the disk-plate stack. When the support member 118 is rotated centrifugal force urges the weights 92 in the direction of the arrow, as indicated in FIGS. 4 and 5, pivoting the weights 92 so that the cam surface 138 applies a load to pressure plate 116 in a direction away from the support member 118. Thus the weights move from the rest position, as shown in FIG. 3, to their load applying position, as shown in FIG. 4. The axial movement of the pressure plate 116 is restrained by the springs 94 but at a predetermined rotational speed the combined force of all the weights can compress the springs 94 sufficiently to cause frictional engagement between the opposing surfaces of the disk-plate stack.

Advantageously, the speed at which the weights 92 overcome the restraining force of the springs 94 can be adjusted by the operator with the present invention while the vehicle is moving on the track. It is preferred that the screws 122 are previously set within a predetermined range prior to arrival on the track so that fine adjustment of the speed can be made while the vehicle is moving. Adjustments of greater magnitude can be made by substitution of springs having different spring coefficient as is known by those skilled in the art.

ADJUSTMENT DEVICE

Turning now to FIG. 4, the adjustment device 34 includes a bearing inner race/shaft adapter 140 and an outer race/hydraulic fixed element 142 having a plurality of ball bearings 144 therebetween. Internal retaining rings 146A and 146B are provided for positioning of the ball bearings relative to the inner and outer races. Alternatively, thrust bearings and a radial bearing may be used in place of the ball bearings. Additionally, lip type oil seals 148A and 148B are provided for sealing purposes. The inner race 140 is positioned between the lock collar 150 and the spacer collar 152. A thrust washer 154 and spacer collar 152 are provided for proper positioning of the device 34 relative to clutch 32.

The moving portions of device 34 relative to the shaft 18 include the hydraulic cylinder or bearing race 50 and the adjusting ram/bearing race 156 having angular contact ball bearings 158 therebetween. Internal retaining rings 160A and 160B are provided for positioning the ball bearings relative to the race members 156 and 50. Alternatively, thrust bearings and radial bearing may be used in place of the ball bearings 158. A labyrinth seal 162 and labyrinth seal 164 are provided for sealing purposes. Seal 162 is held in place by ring 154. Alternatively, felt seals may be used in place of the labyrinth seals.

A hydraulic cylinder closure 166 is threadedly connected to a hydraulic cylinder 50. Additionally, a locking device 168 is provided to prevent inadvertent removal of closure 166.

Lubrication fitting 170 is provided with adjusting ram 156 to allow lubrication of the bearings therein. Ram shoulder 156A of the adjusting ram 156 is configured for positioning adjacent to thimble shoulder 130A. Additionally, thimble retainer member 172 is provided on the other side of thimble shoulder 130A and is secured to ram 156 by bolts. Hydraulic cylinder 50 includes two passageways, the first passageway 174 pressurizes chamber 84 to move the thimble 130 into the clutch housing 114 for the lockup mode and the second passageway 178 pressurizes chamber 64 to move the thimble out of clutch housing 114 for the adjusting mode.

ADJUSTER/ACCUMULATOR

Figure 6:
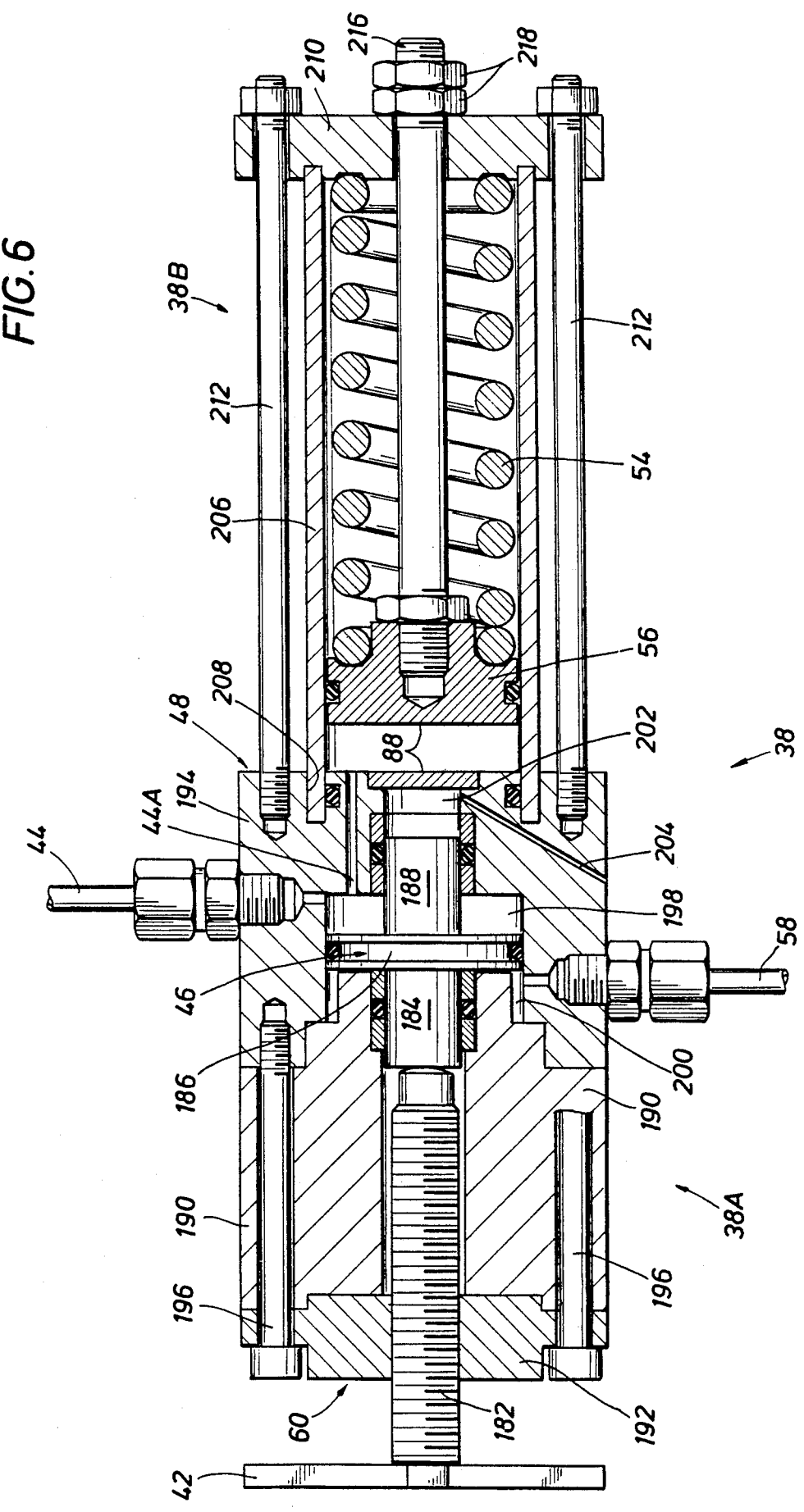
FIG. 6 is a detailed enlarged sectional elevation view of the remote adjuster device and the hydraulic fluid accumulator shown in FIGS. 1 and 2.

Turning now to FIG. 6, the adjuster/accumulator 38, as shown in FIG. 1 and shown schematically in FIG. 2, is shown in enlarged detail sectional view. The adjuster 38A includes handle 42 attached to externally threaded shaft 182 which movably engages piston 46 including shaft 184, piston member 186 and shaft 188. Adjuster housing section 190 is positioned between end member 192 and end member 194 by means of bolts 196 threadedly received into end member 194 to create chambers 198 and 200 wherein the piston 46 slides. Hydraulic line 44 is fluidly connected to chamber 198 for the clutch slip adjustment. Hydraulic line 58 is connected into chamber 200. Chamber 200 of adjuster 38A provides a reservoir for the fluid displaced by chamber 84 of adjustment device 34 when the volume of chamber 84 is reduced due to an increase in volume of chamber 64. It is to be understood that when the pressure in line 44 is increased and therefore pressure in chamber 64 is increased, the springs 94 are compressed. When the pressure in line 44/chamber 64 is decreased by adjuster 38A, the springs urge the cylinder 50 to move the thimbles 130 into clutch 32.

Passage line 44A from chamber 198 to chamber 88 of accumulator 38B is provided by boring a hole in end member 194. Chamber 202 provides for travel of shaft 188 and air vent passage 204 is provided for proper operation of the piston to prevent any imbalance in the system as is known by those skilled in the art.

Turning now to the accumulator 38B, cylinder 206 is received into annular slot 208 in end member 194 and is secured in place by accumulator end plate 210. Plate 210 is held in place by bolts 212 received through apertures in plate 210 and received into threaded bores of adjuster end member 194. Chamber 88 in cylinder 206 is defined by spring retainer or piston 56. Spring 54 is precompressed by means of compression bolt 216 for the purposes previously disclosed. The compression bolt 216 is threadedly received into spring retainer 214 and uses double locking bolts 218 against end plate 210 to prevent inadvertent changes of the preload that could be caused by the high vibrations. In summary, the spring 54 is preloaded for urging the fluid back into lines 44 after the lockup system is released, as shown in FIG. 2, but allows accumulation of fluid from the system into chamber 88 when the lockup system is activated.

USE AND OPERATION

Rest Position

In the rest position the support member 118 is not rotated therefore the weight members 92 will be in the position shown in FIG. 3. Since no load is placed on pressure plate 116, the disks and the plates are in the non-engaged position. In the rest position, the distance parallel to the axis of axle 18 for chamber 84 is preferably 0.166 inch and the axial distance of chamber 64 is preferably 0.110 inch in the preferred embodiment.

Slippage Adjustment Position

As best shown in FIG. 4, the support member 118 is rotatably fixed to the plates and housing 114 by bolt 176. Hub 108 is rotatable fixed to shaft 18 and disks 102, 104 and 106. Upon rotation the weights 92 pivot, to the position shown by the arrow in FIGS. 4 and 5, to urge the pressure plate 116 toward plate 100 to engage the plurality of plates and disks. The speed at which the weights 92 overcome the restraining force of the springs 94 can be adjusted by increasing or decreasing the pressure in chambers 64. When the pressure in chamber 64 is increased, the thimble 130 slides out from clutch 32 to increase the required stall speed or slip. A decrease in pressure of chamber 64 allows the force of the springs 94 to slide the thimble 130 into clutch 32 to decrease the required stall speed or slip.

Advantageously, these adjustments can be made while the vehicle is moving on the track and does not require repeated, inconvenient and time consuming pit stops for manual adjustment of the screws 122 to achieve the optimum stall speed.

Lockup Position

Even when the clutch is hooked up it continues to slip from approximately 3% to 8%. The prior centrifugal friction clutches have not been able to prevent some slippage and a higher percentage of hookup is desirable.

FIG. 5 illustrates the present invention in the lockup position that is achieved when the operator presses the foot pedal 40 or any other similar actuator means so as to increase the pressure in line 78, line 58, line 82 and line 44. The increase in pressure in chamber 84 moves the six thimbles 130 into engagement with the six pressure plate stems 120. More particularly, the direct engagement of the shoulder 130B of each thimble 130 with each shoulder 120A of the six stems drives the plates and disks into a higher friction engagement than previously available in the conventional centrifugal friction clutches. Both the force of the pressure driven thimble 130 and the force of the weight members 92 achieves the lockup position which provides improved acceleration and top end speed for the vehicle. As an additional feature of the present invention, when the clutch is in the locked up position, the entire rolling mass of the vehicle 12, because of its direct drive to the motor 24, acts as a fly wheel increasing the top end speed.

The foregoing disclosure and description of the invention are illustrative and explanatory thereof, and various changes in the size, shape and materials, as well as in details of the illustrative construction may be made without departing from the spirit of the invention.

What is claimed is:

1. An improvement to a centrifugally actuated friction clutch adapted for use with a vehicle of the type wherein at least one clutch plate and one clutch disk is provided, wherein the disk is adjacent to and engagable with the plate, wherein a weight support member, having an aperture, is concentric with the plate and disk and is interlocked with the plate for rotation therewith, said weight support member having at least one pivotable weight means for loading the plate to frictionally engage the disk upon rotation of the weight support member, and wherein means for urging the plate to said weight support member is provided to restrain pivotal movement of the weight means to resist frictional engagement of the plate with the disk below a predetermined speed of rotation of the plate, wherein the improvement comprises
    a holder means for retaining the means for urging; and
    a hydraulic adjuster means fluidly coupled to the clutch to move the holder means relative to the clutch plate for adjusting the speed at which the plate operably engages the disk.

2. Apparatus of claim 1 wherein said means for urging is a plurality of springs, said adjuster means for adjusting comprises
    a plurality of said holder means for retaining the springs; and
    means for movably mounting said holder means with the plate, said holder means movable relative to the plate between an extended position and a compressed position for providing engagement of the plate and the disk.

3. Apparatus of claim 2 further comprising
    a plurality of stems being interengaged with the plate and extending through apertures in said weight support member;
    means for moving the plurality of holder means to the compressed position for engagement with a corresponding stem for providing increased frictional engagement of the clutch plate and disk.

4. Apparatus of claim 1 wherein said adjuster means for adjusting comprises
    means for movably mounting said holder means with said plate, said holder means movable relative to the plate between an extended position and a compressed position, and
    means for moving said holder means between the extended position and the compressed position while allowing the means for urging to interact with the forces of the weight means.

5. Apparatus of claim 4 wherein said vehicle having a rear axle and said means for moving comprises
    an element axially fixed relative to the vehicle rear axle, and
    a cylinder movably mounted relative to said element for moving said holder means.

6. Apparatus of claim 5 wherein said means for moving provides lockup positioning of the holder means relative to the plate for increased frictional engagement of the plate and disk.

7. Apparatus of claim 1 wherein said adjuster means for adjusting comprises
    an element axially fixed relative to the friction clutch, and
    a cylinder movably mounted relative to said element for providing increased and decreased engagement of the plate and the disk.

8. Apparatus for adjusting a friction clutch adapted for use with a vehicle axle, the clutch having a plate, a weight support member having movable weights and apertures, and means for urging the plate to the weight support member, said apparatus comprises
    a holder means for retaining the means for urging,
    an element axially fixed relative to the clutch,
    a cylinder movably mounted relative to said element for moving said holder means to operably provide remote adjustment of the speed at which the weights counteract the force of the means for urging,
    a plurality of stems being interengaged with the plate and extending through apertures of said weight support member, and
    said cylinder moving the plurality of holder means to the compressed position for engagement with a corresponding stem for providing increased frictional engagement of the clutch while the vehicle is moving.

9. Apparatus of claim 8 wherein said means for urging comprises a plurality of springs.

10. A centrifugally actuated friction clutch adapted for use with a vehicle, comprising,
    a clutch plate,
    a clutch disk adjacent to and engagable with said plate,
    means for urging disengagement of said plate with said disk below a predetermined speed,
    a holder means for retaining the means for urging,
    an adjuster means remotely actuated and coupled to the clutch for allowing movement of the holder means relative to the clutch plate between an extended position and a compressed position for adjustment of stall speed while the vehicle is moving.

11. Apparatus for adjusting a friction clutch, said clutch having a plate, a disk and means for urging the disengagement of the plate and disk, said apparatus comprises
    a holder means for retaining the means for urging,
    means remotely actuated and coupled to the clutch for moving said holder means for engagement with a surface of the plate while the vehicle is moving to operably provide increased frictional engagement of the clutch.

* * * * *